(12) United States Patent
Soueidan

(10) Patent No.: US 9,667,098 B2
(45) Date of Patent: May 30, 2017

(54) HYDRAULICALLY-DRIVEN EXTENDED-RUNTIME FLYWHEEL UNINTERRUPTIBLE POWER SUPPLY

(71) Applicant: Bassem Soueidan, Dubai (AE)

(72) Inventor: Bassem Soueidan, Dubai (AE)

( * ) Notice: Subject to any disclaimer, the term of this patent is extended or adjusted under 35 U.S.C. 154(b) by 0 days.

(21) Appl. No.: 15/257,879

(22) Filed: Sep. 6, 2016

(65) Prior Publication Data

US 2016/0380479 A1    Dec. 29, 2016

Related U.S. Application Data

(63) Continuation-in-part of application No. 14/328,903, filed on Jul. 11, 2014, now abandoned.

(51) Int. Cl.
| | |
|---|---|
| *F16D 33/02* | (2006.01) |
| *H02J 9/06* | (2006.01) |
| *F03G 3/08* | (2006.01) |
| *H02K 7/18* | (2006.01) |
| *F16D 48/02* | (2006.01) |
| *F16D 48/06* | (2006.01) |

(52) U.S. Cl.
CPC ............ *H02J 9/066* (2013.01); *F03G 3/08* (2013.01); *F16D 33/02* (2013.01); *F16D 48/02* (2013.01); *F16D 48/066* (2013.01); *H02K 7/1853* (2013.01); *F16C 2361/55* (2013.01); *F16C 2380/28* (2013.01); *F16D 2048/0203* (2013.01); *F16D 2048/0221* (2013.01); *F16D 2048/0278* (2013.01); *F16D 2048/0281* (2013.01); *G05B 2219/41274* (2013.01)

(58) Field of Classification Search
CPC ........ F16D 33/02; F16D 48/066; F16D 48/02; F16D 2048/0203; F16D 2048/0221; F16C 2361/55; F16C 2380/28; G05B 2219/41274; H02J 9/066; H02K 7/1853; F03G 3/08
See application file for complete search history.

(56) References Cited

U.S. PATENT DOCUMENTS

| 2,581,550 A * | 1/1952 | Misfeldt | B21C 23/21 164/314 |
|---|---|---|---|
| 6,441,505 B1 * | 8/2002 | Poletti | F02B 63/04 123/350 |

(Continued)

*Primary Examiner* — Logan Kraft
(74) *Attorney, Agent, or Firm* — Loza & Loza, LLP; Peter Zura

(57) ABSTRACT

Apparatus, system and method for providing supplementary power. A vessel is configured to receive and contain hydraulic fluid, where the vessel includes a piston configured within the vessel to be vertically displaced by the hydraulic fluid and provide pressure from the weight of the piston to a fluid supply line. A solenoid valve is operatively coupled to the fluid supply line; and connected to a flywheel power supply that includes a flywheel and a hydraulic drive adapter, wherein the hydraulic drive adapter is operatively coupled to the solenoid valve via the fluid supply line. A signal is received indicating a power outage, where the solenoid valve is further configured to open in response to the signal and provide the hydraulic fluid pressurized by the piston to the hydraulic drive adapter and causes the flywheel to operate and provide the supplementary power.

18 Claims, 5 Drawing Sheets

(56) References Cited

U.S. PATENT DOCUMENTS

| | | | | |
|---|---|---|---|---|
| 6,748,737 B2* | 6/2004 | Lafferty | .................... | F03D 9/12 |
| | | | | 290/44 |
| 7,043,906 B2* | 5/2006 | Suzuki | .................. | E02F 9/2217 |
| | | | | 60/422 |
| 2013/0049473 A1* | 2/2013 | Brech | ....................... | H02J 9/08 |
| | | | | 307/68 |
| 2015/0293548 A1* | 10/2015 | Simons | ..................... | G05F 1/66 |
| | | | | 700/295 |

\* cited by examiner

HYDRAULICALLY-DRIVEN EXTENDED-RUNTIME FLYWHEEL UNINTERRUPTIBLE POWER SUPPLY

RELATED APPLICATIONS

The present application is a continuation-in-part of U.S. patent application Ser. No. 14/328,903 to Bassem Soueidan, titled "Hydraulically-Driven Flywheel Uninterruptable Power Supply," filed Jul. 11, 2014, the contents of which is incorporated in its entirety herein.

BACKGROUND

Uninterruptible power supplies, also known as uninterruptible power sources (UPS) are electrical apparatuses known in the art that provide emergency power to a load when the input power source, typically mains power, fails. A UPS differs from an auxiliary or emergency power system or standby generator in that it will provide near-instantaneous protection from input power interruptions, by supplying energy stored in batteries, supercapacitors, or flywheels. The on-battery runtime of most uninterruptible power sources is relatively short (only a few minutes) but sufficient to start a standby power source or properly shut down the protected equipment. A UPS is typically used to protect hardware such as industrial equipment, computers, data centers, telecommunication equipment or other electrical equipment where an unexpected power disruption could cause injuries, fatalities, serious business disruption or data loss. UPS units range in size from units designed to protect a single computer without a video monitor (around 200 volt-ampere rating) to large units powering entire data centers or buildings.

Rotary Flywheel UPS systems used in mission critical facilities provide very limited time to transition to back up generators after a power loss usually 15 to 45 seconds depending on the load. Theoretically, this "ride through" should be adequate to allow the backup generators to start. In the event that the backup generators fail to start, there is no time for an orderly shutdown of the systems. Costs associated with power failures are significant, and may collectively (billions of dollars annually). As an example, banks where millions of transactions are taking place every minute are exposed to significant losses during a power failure. Most mission critical facilities will install battery backup in order to provide adequate time for orderly shutdowns and to ensure that there is adequate time to get the backup generators started. Battery backup used to provide power to critical systems for an extended period of time is often expensive, requires dedicated space with special ventilation and fire protection systems, requires maintenance and is environmentally unfriendly among other things. Additionally, circumstances may occur where the ride through time in a rotary wheel UPS is not sufficient to allow backup batteries or generators to fully engage. In other instances, power outages may be brief enough where it becomes inefficient to engage in a backup battery/generator system, only to disengage a short time later. Accordingly, extending the run time (or ride through) of a rotary wheel UPS may provide advantageous benefits.

SUMMARY

In an illustrative embodiment, an apparatus is disclosed for providing extend runtime for a flywheel rotary UPS, comprising a vessel, configured to receive and contain fluid; a piston having a predetermined weight, configured within the vessel to have the weight of the piston independently and vertically displaced by the fluid and provide pressure from the displacement; a fluid discharge line, operatively coupled to an output of the vessel; a valve, operatively coupled to the fluid discharge line; a fluid supply line operatively coupled to the valve; a flywheel rotary UPS comprising: a motor configured to rotate a flywheel for producing energy when power is applied to a main power input of the flywheel rotary UPS, and a hydraulic drive adapter operatively coupled to the flywheel and to the fluid supply line; wherein the flywheel is configured to engage with the hydraulic drive adapter and the valve is configured to automatically open, when no power is received at the main power input, to provide fluid pressurized by the piston to the hydraulic drive adapter and cause the flywheel rotary UPS to continue rotating for an extended period of time after no power is received.

In another illustrative embodiment, a method is disclosed for providing extend runtime for a flywheel rotary UPS, comprising receiving and containing fluid in a vessel comprising a piston having a predetermined weight, positioned within the vessel, wherein the weight of the piston provides a pressure for the fluid in the vessel via an independent vertical displacement of the weight of the piston by the fluid, and wherein the vessel is operatively coupled to a fluid supply line; operatively rotating a flywheel of the flywheel rotary UPS via a motor when power is applied to a main power input of the flywheel rotary UPS; and engaging the flywheel to a hydraulic drive adapter and automatically opening a valve when no power is received at the main power input to provide fluid pressurized by the piston to the hydraulic drive adapter and cause the flywheel rotary UPS to continue rotating for an extended period of time after no power is received.

In another illustrative embodiment, an apparatus is disclosed for providing extend runtime for a flywheel rotary UPS, comprising a vessel, configured to receive and contain fluid; a piston having a predetermined weight, configured within the vessel to have the weight of the piston independently and vertically displaced by the fluid and provide pressure from the displacement; a fluid discharge line, operatively coupled to an output of the vessel; a valve, operatively coupled to the fluid discharge line; a fluid supply line operatively coupled to the valve; a flywheel rotary UPS comprising a motor configured to rotate a flywheel for producing energy when power is applied to a main power input of the flywheel rotary UPS, a sensor for sensing one or more thresholds of at least one of rotational characteristics of the flywheel and/or energy produced by the flywheel, and a hydraulic drive adapter operatively coupled to the flywheel and to the fluid supply line; wherein the flywheel is configured to engage with the hydraulic drive adapter and the valve is configured to automatically open, when no power is received at the main power input, and upon receiving a control signal from the sensor, to provide fluid pressurized by the piston to the hydraulic drive adapter and cause the flywheel rotary UPS to continue rotating for an extended period of time after no power is received.

Further scope of applicability of the present disclosure will become apparent from the detailed description given hereinafter. However, it should be understood that the detailed description and specific examples, while indicating preferred embodiments, are given by way of illustration only, since various changes and modifications within the spirit and scope of the invention will become apparent to those skilled in the art from this detailed description.

BRIEF DESCRIPTION OF THE FIGURES

The present invention is illustrated by way of example and not limitation in the figures of the accompanying drawings, in which like references indicate similar elements and in which.

DETAILED DESCRIPTION

Figure 1:
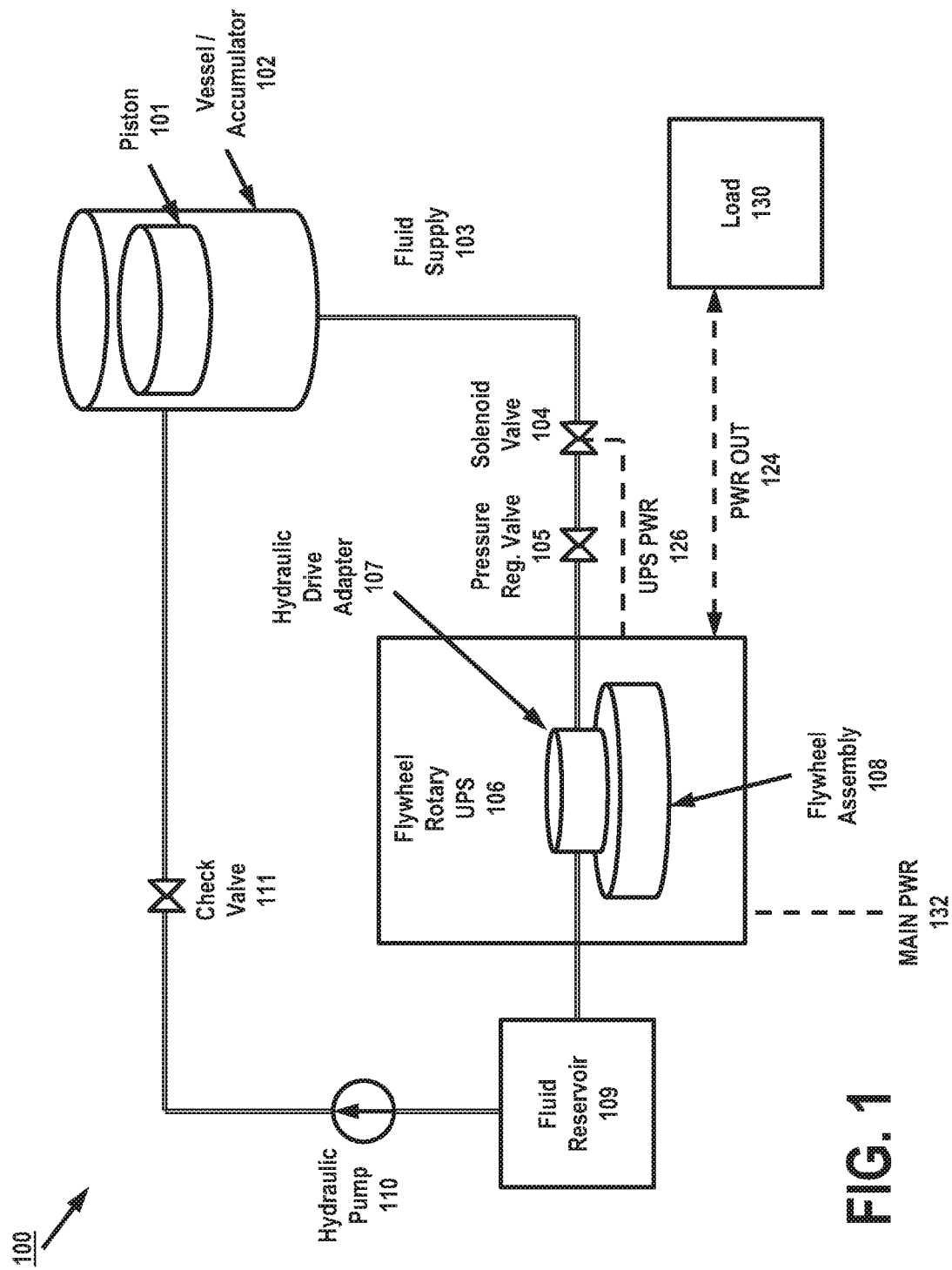
FIG. 1 illustrates a hydraulic UPS system under one exemplary embodiment comprising a hydraulic fluid vessel/accumulator containing a sealed piston or weight for providing hydraulic fluid pressure that is released to a UPS flywheel when a solenoid valve is opened via a power failure signal.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Turning to FIG. 1, an exemplary embodiment is provided of a UPS power system 100 comprising a piston 101 that is contained and preferably sealed within vessel/accumulator 102 (hereafter "vessel"). In one embodiment, piston 101 is manufactured from a dense and/or heavy material such as a metal or alloy (e.g., steel, tungsten, brass, etc.) or plastic, rubber, or any suitable combinations thereof. Piston 101 may be coated or encased in a protective material to prevent corrosion and the like and to provide a suitable seal against the walls of the vessel 102. The protective material of the piston 101 may also include a material, such as a polyamide material with an embedded lubricant additive, to assist the piston in travelling along the length of the vessel 102. Vessel 102 may be filled with a fluid such as hydraulic fluid which may be oil or water-based fluid which may be provided from fluid reservoir 109, via hydraulic pump 110. Hydraulic pump may be a hydrostatic or hydrodynamic pump, depending on the application. When configured, hydraulic pump 110 provides positive displacement for piston 101 in which the displacement (flow through the pump per rotation of the pump) is fixed, or may be configured as a variable displacement pump, which allows the displacement to be adjusted. Flow from hydraulic pump 110 may be controlled via check valve 111.

During normal operation, flywheel rotary UPS system 106 receives power from main power 132, which allows the flywheel of flywheel assembly 108 to continuously rotate. The inertia of the (high-mass) spinning flywheel of flywheel assembly 108 may serve as a source of flywheel energy storage to provide short-term ride-through in the event of power loss for main power 132. The flywheel may also serve as a buffer against power spikes and sags, since such short-term power events are not able to appreciably affect the rotational speed of the high-mass flywheel. Conventionally, flywheel-based UPS systems typically provide 10 to 20 seconds of protection before the flywheel has slowed and power output stops. In some cases, flywheel rotary UPS 106 may be combined with standby diesel generators, providing backup power only for the brief period of time the engine needs to start running and stabilize its output. By using a transmission gearbox (not shown), the rotational inertia of the flywheel of the flywheel assembly 108 can be used to directly power a load 130 via the output (OUT). Multiple flywheels (e.g., see FIG. 2) can likewise be connected in parallel through mechanical countershafts, without the need for separate motors and generators for each flywheel.

In certain illustrative embodiments, there may be a need to extend the runtime of flywheel rotary UPS 106 past its typical rotation capability. In such circumstances, the flywheel rotary UPS 106 may be equipped with a hydraulic drive adapter 107 that provides energy to the flywheel assembly 108 via fluid passing through the adapter.

As vessel 102 is filled with hydraulic fluid, the weight of piston 101 provides a counter-pressure within vessel 102. When vessel 102 is completely filled, the piston 101/vessel 102 may be considered at a maximum pressure. A hydraulic fluid supply line 103 is preferably coupled to a solenoid valve 104 that may be configured to be naturally in a "closed" state when power (e.g., 132) is present. In one illustrative embodiment, solenoid valve 104 may couple directly or indirectly to main power 132, where, if the main power 132 is turned off, solenoid valve 104 opens. In an illustrative embodiment, flywheel rotary system UPS 106 may transmit a UPS power signal 126 upon loss of power to open solenoid valve 104. In some illustrative embodiments, the UPS power signal 126 may be the main power line 132, or may be a separate signal transmitted from the flywheel rotary UPS 106 that is dependent upon the main power signal 132. In some illustrative embodiments, UPS power signal 126 may be a sensor signal, as explained in further detail below. In an illustrative embodiment, the solenoid valve 104 may be coupled to one or more sensors (see FIG. 5), where, upon receiving a sensor signal, opens. Once solenoid valve 104 opens, the pressure from piston 101 causes fluid in vessel 102 to flow through valve 104 and pressure regulator valve 105 and into flywheel rotary UPS 106.

In one embodiment, UPS 106 operates under flywheel energy storage principles by accelerating a rotor, such as flywheel 108 to a very high speed and maintaining the energy in the system as rotational energy. When energy is extracted from the system, the flywheel's rotational speed may be reduced as a consequence of the principle of conservation of energy; adding energy to the system correspondingly results in an increase in the speed of the flywheel. When power is being received from main power 132, the flywheel assembly rotates using the power provided by main power 132 via an AC motor or other suitable configuration. Once main power 132 is cut off, a transfer switch may be activated to cause the flywheel of flywheel assembly 108 to provide power via an AC generator. In an illustrative embodiment, the hydraulic drive adapter 107 may be engaged with the flywheel concurrently with the power outage via a suitable linkage, wherein incoming fluid would provide additional rotational energy. In another illustrative embodiment, the flywheel rotary UPS 106 may delay engagement of the hydraulic drive adapter 107 for a predetermined period of time (e.g., 5-15 seconds) to allow the already-stored energy to be released (124) to the load 130 before switching to hydraulic power. In another illustrative embodiment, one or more sensors (see FIG. 5) may sense the rotational energy of the flywheel and/or the power output of flywheel rotary UPS 106. The hydraulic drive adapter 107 may then be engaged when the rotational energy and/or power output is sensed to be below an acceptable minimum.

In a simplified embodiment, UPS 106 may comprise a rotor suspended by bearings inside a vacuum chamber to reduce friction, connected to a combination electric motor and electric generator. The flywheel may be a large steel flywheel rotating on mechanical bearings. In one embodiment, the flywheel may comprise carbon-fiber composite rotors that have a higher tensile strength than steel and are an order of magnitude less heavy. Magnetic bearings may be used instead of mechanical bearings, to reduce friction. In one embodiment, high-temperature superconductor (HTSC) bearings or hybrid bearings may be used, where permanent magnets support a load and high-temperature superconductors are used to stabilize it. Superconductors may be advantageous in stabilizing a load because they may operate as diamagnets. If the rotor tries to drift off center, a restoring force due to flux pinning (magnetic stiffness of the bearing) restores it. Since flux pinning is a factor for providing the stabilizing and lifting force, the HTSC can be made much more easily for flywheel energy storage than for other uses. HTSC powders can be formed into arbitrary shapes so long as flux pinning is strong.

Compared with other techniques for storing electricity, flywheel energy storage systems have long lifetimes (lasting decades with little or no maintenance. Full-cycle lifetimes for flywheels may range from in excess of $10^5$, up to $10^7$, cycles of use), and provide high energy density (100-130 W·h/kg, or 360-500 kJ/kg), and large maximum power output. The energy efficiency (ratio of energy out per energy in) of flywheels can be as high as 90%. Typical capacities may range from 3 kWh to 133 kWh.

The energy density of flywheel 108 may vary, depending on the rotor geometry used and the properties of material being used. For single-material, isotropic rotors, this relationship may be expressed as $$\frac{E}{m} = K\left(\frac{\sigma}{\rho}\right),$$

where E is the kinetic energy of the rotor (J), m is the rotor's mass (kg), K is the rotor's geometric shape factor, $\sigma$ is the tensile strength of the rotor material (Pa) and $\rho$ is the material's density (kg/m$^3$).

Continuing with the example of FIG. 1, hydraulic fluid entering UPS 106 at a predetermined pressure specified by regulator valve 105 causes hydraulic drive adapter 107 to operate flywheel 108 for generating power (OUT) to the load 130. In one embodiment, hydraulic fluid exiting UPS 106 is fed back to fluid reservoir 109, which regenerates the fluid for future use in vessel 102 via hydraulic pump 110. Thus, under normal operating conditions in one embodiment, flywheel 108 of the UPS is set to rotate at a high speed. Upon power failure, flywheel 108 continues to rotate to provide electrical power. When solenoid valve 104 opens, pressurized fluid flows, and continues to flow under pressure provided by piston 101. Hydraulic drive adapter 107 rotates as a result of the pressurized fluid and the flywheel continues to rotate until the fluid is completely discharged and piston 101 reaches the bottom of the vessel 102.

The embodiment of FIG. 1 (as well as other embodiments disclosed herein) provides a simple and elegant solution that is also environmentally friendly for providing uninterruptable power to a system using hydraulic technology. As pressure for the hydraulic fluid is being provided by the weight of piston 101 in one embodiment, the fluid may be easily regulated and input into UPS 106 for the creation of energy. Thus no expensive and/or complicated genset arrangements of secondary power origination are required. Of course, the piston arrangement in the present disclosure may be combined with such systems as required. Furthermore, pressure from piston 101 may be complimented and/or substituted by air pressure if necessary (see FIG. 4). In this embodiment, a bladder may be provided within vessel 102 and pressurized to achieve the required fluid pressure. Used alone, the inflated bladder would provide the pressure within vessel 102 to discharge the hydraulic fluid. Used in combination with piston 101, the bladder would provide additional pressure that that already being provided by the weight of piston 101. Such an embodiment may be advantageous when variable pressure may be required; the bladder would provide an efficient means for adding necessary pressure to the existing piston in the arrangement.

Figure 2:
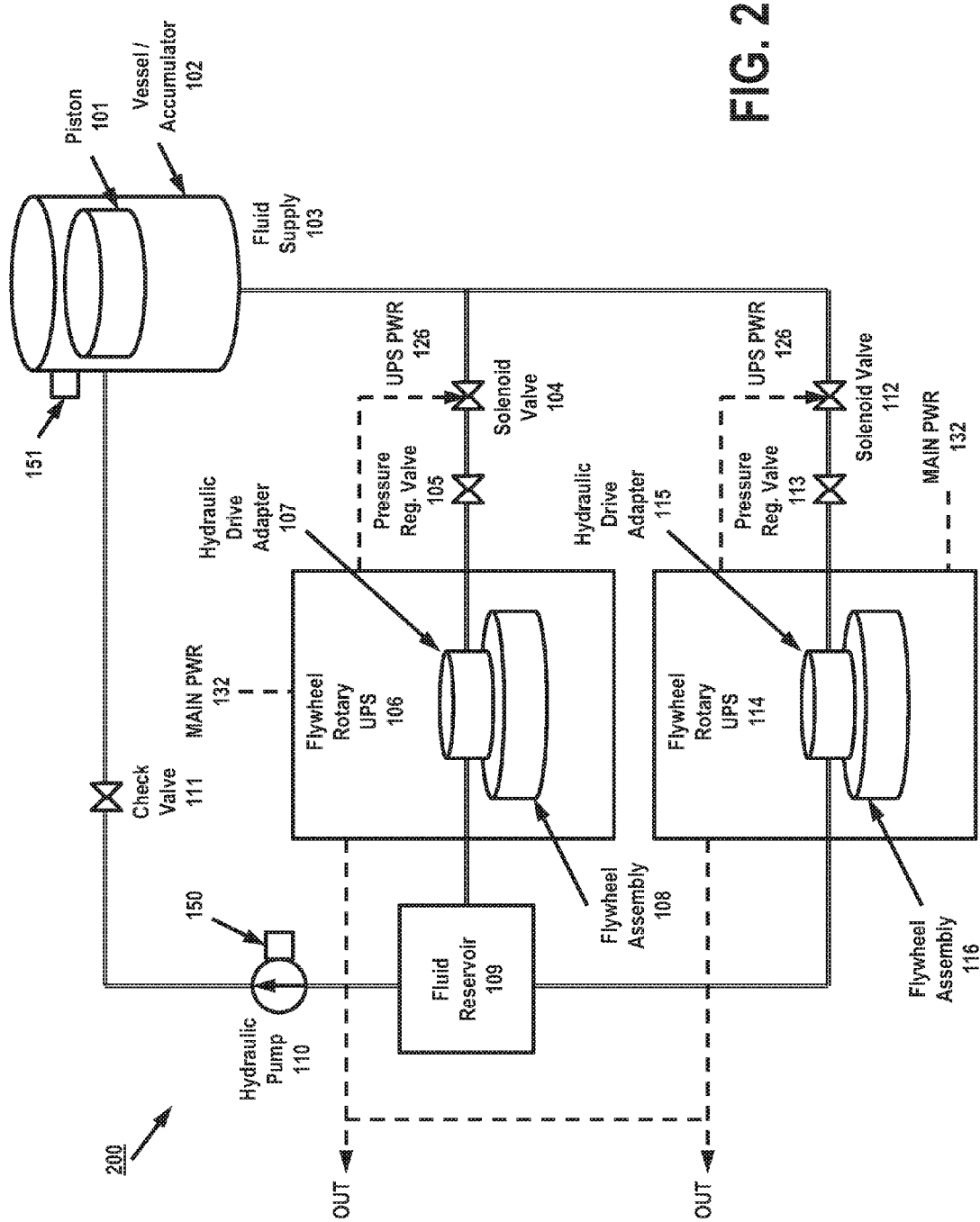
FIG. 2 illustrates a hydraulic UPS system under another exemplary embodiment comprising a hydraulic fluid vessel/accumulator containing a sealed piston or weight for providing hydraulic fluid pressure that is released to a plurality of UPS flywheels when one or more solenoid valves are opened via a power failure signal.

Turning to FIG. 2, another exemplary embodiment is provided, which is similar to the embodiment of FIG. 1, except that the piton 101 and vessel 102 configuration is used to provide fluid to a plurality of UPS systems (106, 114), where each of the UPS systems may provide separate backup power (OUT) to a load or separate system, or alternately combined (shown by connecting dotted line between OUT signals in FIG. 2). Such a configuration may be advantageous in applications where (a) multiple, smaller UPS systems may be used in lieu of a more expensive, singular UPS, and/or (b) providing targeted UPS capabilities to multiple locations within a large installation.

The exemplary system 200 of FIG. 2 comprises a piston 101 that is contained and preferably sealed within vessel/accumulator 102 (hereafter "vessel"). Similar to the embodiment of FIG. 1, piston 101 may be manufactured from a dense and/or heavy material such as a metal or alloy (e.g., steel, tungsten, brass, etc.) or plastic, rubber, or any suitable combinations thereof. Piston 101 may be coated or encased in a protective material to prevent corrosion and the like. Vessel 102 is filled with a fluid such as hydraulic fluid which may be oil or water-based fluid which may be provided from fluid reservoir 109, via hydraulic pump 110. Hydraulic pump may be a hydrostatic or hydrodynamic pump, depending on the application. When configured, hydraulic pump 110 provides positive displacement for piston 101 in which the displacement is fixed, or may be configured as a variable displacement pump, which allows the displacement to be adjusted. Flow from hydraulic pump 110 may be controlled via check valve 111.

As vessel 102 is filled with hydraulic fluid, the weight of piston 101 provides a counter-pressure within vessel 102. When vessel 102 is completely filled, the piston 101/vessel 102 may be considered at a maximum pressure. A hydraulic fluid supply line 103 is preferably coupled to solenoid valves 104, 112 which may be configured to be naturally in a "closed" state. In one embodiment, solenoid valves 104, 112 are respectively coupled to a power system configured to provide a signal (PWR) indicating that power has failed, and that back-up power from system 200 is required. In one embodiment, solenoid valves 104, 112 may be held in a closed position via a continuous PWR signal, indicating that power in a primary system is operating normally. Once power in the main system turns off, the PWR signal is no longer being received, causing solenoid valves 104, 112 to open. As a result, the pressure from piston 101 causes fluid in vessel 102 to flow simultaneously through valves 104, 112 and pressure regulator valves 105, 113 and respectively into flywheel rotary UPS 106, 112. The engagement of the hydraulic drive adapters 107, 115 may be configured similarly to that described above in connection with FIG. 1.

Similar to the embodiment of FIG. 1, UPS 106 and 114 may operate under flywheel energy storage principles by accelerating a rotor, such as respective flywheels 108, 116 via hydraulic drive adapters 107, 115 to a very high speed and maintaining the energy in the system as rotational energy. When energy is extracted from the system (OUT), the flywheel's rotational speed may be reduced as a consequence of the principle of conservation of energy; adding energy to the system correspondingly results in an increase in the speed of the flywheel.

In the embodiment of FIG. 2, solenoid valves 104, 112 are controlled via the same PWR signal. It should be appreciated by those skilled in the art that separate, independent PWR signals may be provided to solenoid valves 104, 112, which in turn would provide separate backup power (OUT) for each UPS 106, 114. In this example, care should be taken to configure system 200 so that, for example, a prolonged use of one UPS (e.g., 114) does not drain hydraulic fluid to a point where the activation of another UPS (e.g., 106) does not create a scenario where insufficient fluid remains in vessel 102 to power a newly-activated UPS. In one embodiment, hydraulic pump may comprise one or more sensors (150) indicating the amount of fluid being pumped, and may further be in communication with one or more sensors (151) in vessel 102 which may monitor the amount of remaining fluid. In the event that an insufficient fluid supply condition is sensed, hydraulic pump 110 may be configured to increase pumping capacity from reservoir 109 to provide sufficient fluid to vessel 102.

Figure 3:
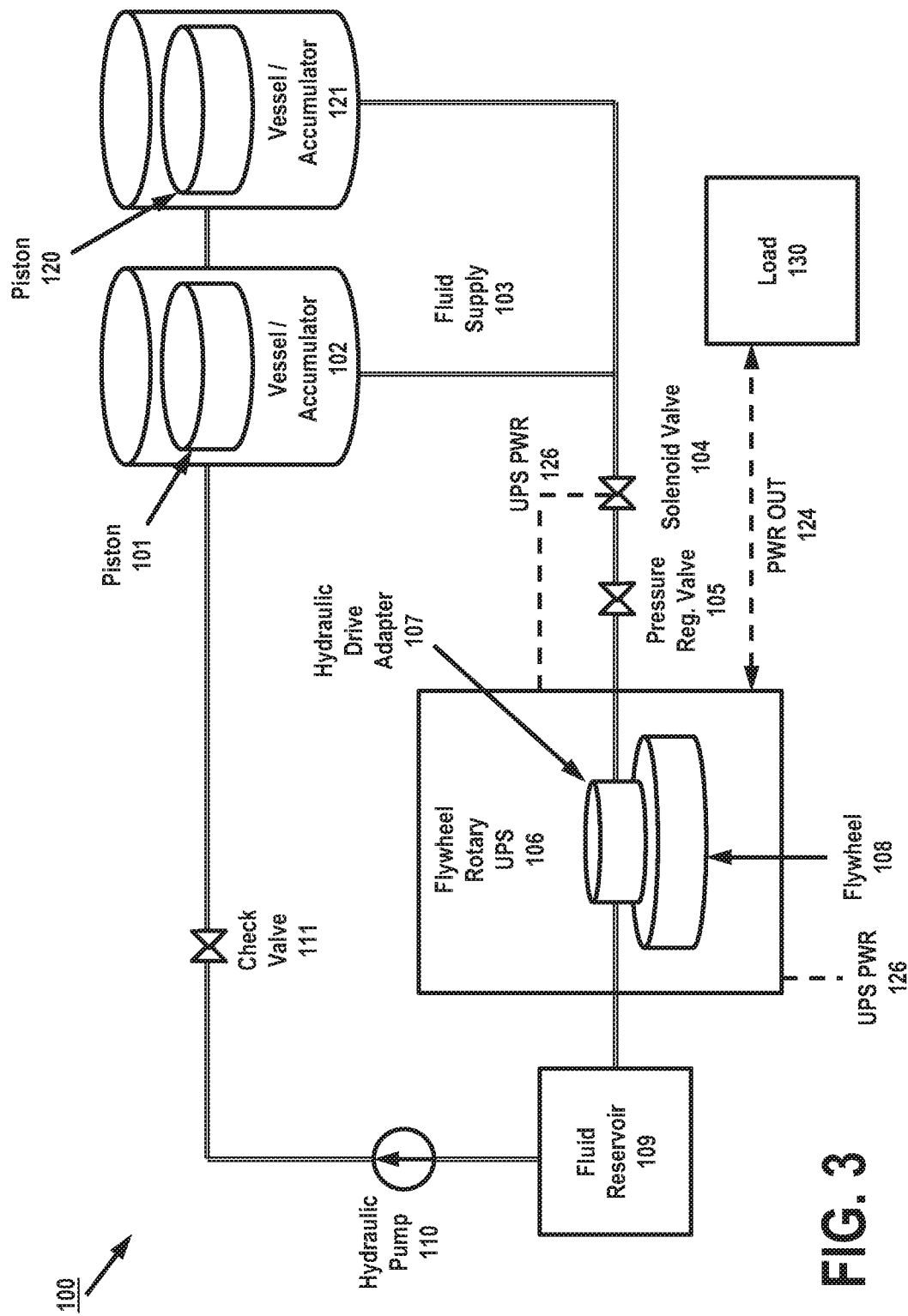
FIG. 3 illustrates a hydraulic UPS system under yet another exemplary embodiment comprising a plurality of hydraulic fluid vessel/accumulators each containing a sealed piston or weight for providing hydraulic fluid pressure that is released to a UPS flywheel when a solenoid valve is opened via a power failure signal.

Turning to FIG. 3, another exemplary embodiment is provided, where multiple vessels (102, 121) and respective pistons (101, 120) are used to drive a UPS 106. Such a configuration may be advantageous for provided extended hydraulic backup capabilities to UPS 106. As similarly described above in connection with FIGS. 1-2, UPS power system 300 comprises pistons 101, 120 that are contained and preferably sealed within respective vessel/accumulators 102, 120. In one embodiment, pistons 101, 120 are manufactured from a dense and/or heavy material such as a metal or alloy (e.g., steel, tungsten, brass, etc.) or plastic, rubber, or any suitable combinations thereof. Pistons 101, 120 may be coated or encased in a protective material to prevent corrosion and the like. Vessels 102, 121 are filled with a fluid such as hydraulic fluid which may be oil or water-based fluid which may be provided from fluid reservoir 109, via hydraulic pump 110. Hydraulic pump 110 may be a hydrostatic or hydrodynamic pump, depending on the application. When configured, hydraulic pump 110 provides positive displacement for pistons 101, 120 in which the displacement is fixed, or may be configured as a variable displacement pump, which allows the displacement to be adjusted. Flow from hydraulic pump 110 may be controlled via check valve 111.

As vessels 102, 121 are filled with hydraulic fluid, the weight of pistons 101, 120 provide a counter-pressure within vessels 102, 121. When vessels 102, 121 are completely filled, the respective piston weight may provide a maximum pressure. A hydraulic fluid supply line 103 is preferably coupled to both vessels 102, 121 and a solenoid valve 104 which should be configured to be naturally in a "closed" state. In one embodiment, solenoid valve 104 is operatively coupled to a power system configured to provide a signal (PWR) indicating that power has failed, and that back-up power from system 100 is required. In one embodiment, solenoid valve 104 may be held in a closed position via a continuous PWR signal, indicating that power in a primary system is operating normally. Once power in the main system turns off, the solenoid valve 104 opens. As a result, the pressure from pistons 101, 120 cause fluid in vessels 102, 121 to flow through valve 104 and pressure regulator valve 105 and into flywheel rotary UPS 106.

In one embodiment, vessels 102, 121 may operate to provide hydraulic fluid simultaneously. In another embodiment, vessels may be designated as "primary" (e.g., 102) and "secondary" (e.g., 121) vessels, and wherein the secondary vessel is equipped with its own solenoid (not shown). Each vessel may be equipped with sensors, similar to the embodiment of FIG. 2, where the level of fluid is sensed and monitored. Here, only the primary vessel (102) discharges hydraulic fluid upon activation of solenoid valve 104. As hydraulic fluid is drained, there may come a point where hydraulic pump 110 is not providing sufficient fluid back to vessel 102 to maintain UPS capabilities. If the sensed level of hydraulic fluid drops below a predetermined threshold, the sensor for the primary vessel activates a solenoid valve for the secondary vessel to provide a hydraulic fluid "assist" along a common fluid supply line 103. With the addition of fluid being provided by the secondary vessel 121, the primary vessel 102 does not have to expend as much fluid, which in turn may allow hydraulic pump 110 to "catch up" with any deficient fluids. If the fluid levels in the primary vessel 102 are raised back to an acceptable threshold, the sensor for the primary vessel 102 may close the solenoid for the secondary vessel. It should be understood by those skilled in the art that further vessels may be added, depending on the application, to create a daisy-chained configuration of vessels for extended UPS operation. Of course, the multiple vessel configuration of FIG. 3 may be combined with the multiple UPS configuration of FIG. 2 to provide still further operational UPS capabilities.

Continuing with the embodiment of FIG. 3, UPS 106 operates under flywheel energy storage principles by accelerating a rotor, such as flywheel 108 via hydraulic drive adapter 107 to a very high speed and maintaining the energy in the system as rotational energy. When energy is extracted from the system, the flywheel's rotational speed may be reduced as a consequence of the principle of conservation of energy; adding energy to the system correspondingly results in an increase in the speed of the flywheel.

In a simplified embodiment, UPS 106 may comprise a rotor suspended by bearings inside a vacuum chamber to reduce friction, connected to a combination electric motor and electric generator. The flywheel may be a large steel flywheel rotating on mechanical bearings. In one embodiment, the flywheel may comprise carbon-fiber composite rotors that have a higher tensile strength than steel and are an order of magnitude less heavy. Magnetic bearings may be used instead of mechanical bearings, to reduce friction. In one embodiment, high-temperature superconductor (HTSC) bearings or hybrid bearings may be used, where permanent magnets support a load and high-temperature superconductors are used to stabilize it.

Hydraulic fluid entering UPS 106 at a predetermined pressure specified by regulator valve 105 causes hydraulic drive adapter 107 to operate flywheel 108 for generating power (OUT) back to the main power system. In one embodiment, hydraulic fluid exiting UPS 106 is fed back to fluid reservoir 109, which regenerates the fluid for future use in vessel 102 via hydraulic pump 110.

In the above configurations, the flywheel UPS may be configured to continuously rotate by getting power from the grid. Accordingly, the output power is advantageously protected from power distortions from the grid. In an alternate embodiment, power may be provided to the flywheel UPS and to the pump. In such a configuration, the power to the UPS is continuous, and the power to the pump is only needed after power is restored, where the pump is utilized to refill and re-pressurize the vessel. As the pump is continuously running, this would cause the flywheel to rotate, which in turn may vitiate the need for a power supply to the flywheel UPS. Such a configuration would be advantageous in reducing installation costs. In some illustrative embodiments, hydraulic pump 110 may be provided with a separate independent power supply, such as a battery.

Figure 4:
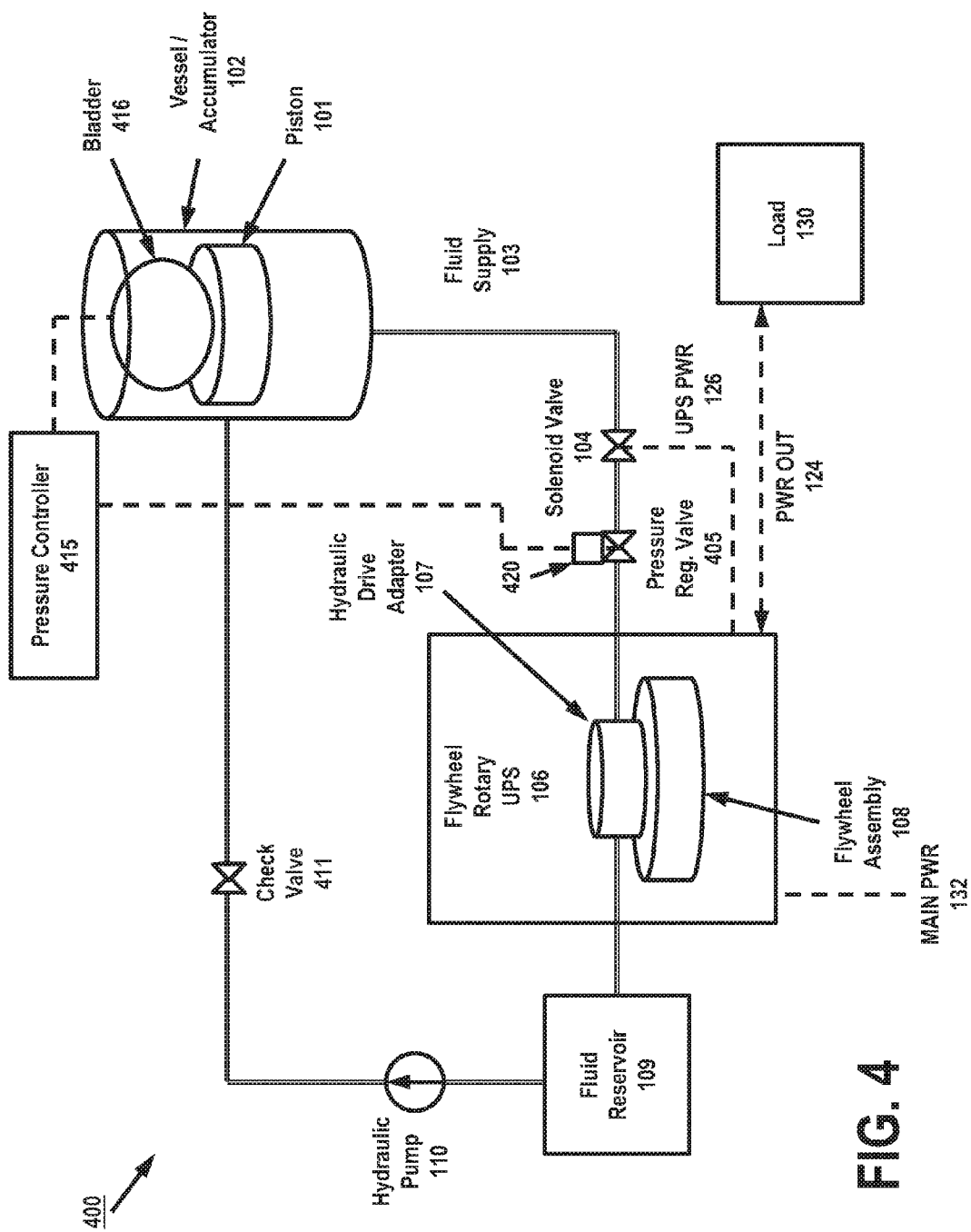
FIG. 4 illustrates a hydraulic UPS system under one exemplary embodiment comprising a hydraulic fluid vessel/accumulator containing a bladder in addition to a sealed piston or weight for providing hydraulic fluid pressure that is released to a UPS flywheel when a solenoid valve is opened via a power failure signal.

Turning to FIG. 4, an embodiment of a UPS system 400 is shown, where the configuration of system 100 is supplemented with the use of air bladders 416 within the vessel 102. As many of the components of system 400 are identical to those discussed above in connection with FIG. 1, their description will not be repeated for the purposes of brevity. In this example, an internal portion of the vessel 102 is equipped with an air (or any other suitable gas) bladder 416 that is coupled to a pressure controller 415. The pressure controller 415 may be equipped with one or more pumps and communications to receive control signals. Upon receiving an appropriate control signal, pressure controller 415 may add or remove pressure from bladder 416, which, in turn, adds or removes pressure to the fluid in the vessel 102 via the piston 101.

Pressure regulator valve 405 of system 400 may be configured with a sensor 420 that senses the pressure and/or volume of fluid passing through pressure regulator valve 405 to determine if a sufficient amount of fluid and/or pressure is present to provide adequate rotational energy to the flywheel via the hydraulic drive adapter 107. If the sensor 420 determines that an insufficient amount of pressure and/or fluid is present, the sensor 420 may transmit a control signal to the pressure controller 415 to increase or decrease the pressure in vessel 102 by inflating/deflating the bladder 416. Such a configuration may be advantageous in cases where a lighter piston 101 is used, which may save manufacturing and/or installation costs. It should be understood by those skilled in the art that the placement of the sensor 420 may vary. In some illustrative embodiments, the sensor 420 may be placed directly in line with fluid supply line 430. In a preferred embodiment, the sensor 420 and pressure controller 415 may be provided with their own independent power sources, such as a battery or other suitable power source.

Figure 5:
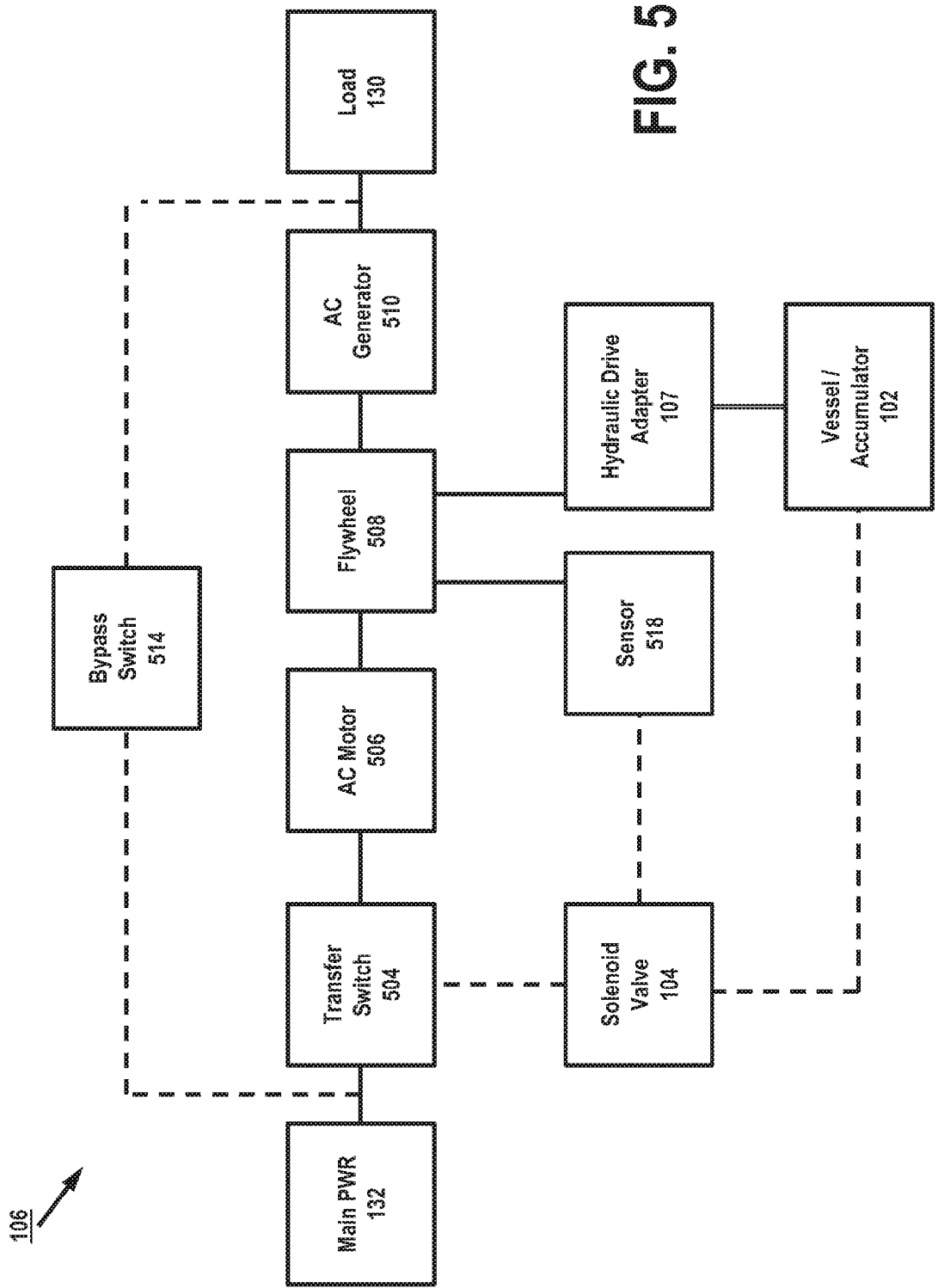
FIG. 5 shows a block diagram of a flywheel rotary UPS of FIG. 1 under an illustrative embodiment.

Turning to FIG. 5, a block diagram of the flywheel rotary UPS 106 is shown under an illustrative embodiment. In this example, the flywheel rotary UPS 106 may include a main power input 132 that receives mains power for normal operation. Main power input 132 may be coupled to a transfer switch 504, which connects power to AC motor 506, which operates to cause flywheel 508 to rotate and build kinetic energy. The flywheel rotary USP 106 may also be equipped with a bypass switch 514 in some illustrative embodiments. When power from the main power 132 is cut off, transfer switch 504 may disconnect from the main power 132, and the kinetic energy from the flywheel 508 may be used by AC generator 510 to provide power to the load 130. It should be understood by those skilled in the art that, while an AC configuration is shown in FIG. 5, other configurations, such as DC motor configurations, are contemplated in the present disclosure.

In an illustrative embodiment, when transfer switch 504 is turned off, the solenoid valve 104 may open as described above to allow fluid from vessel 102 to flow to hydraulic drive adapter 107. In this example, linking gear mechanisms may be provided to allow flywheel 508 to disengage from the AC motor 506 and engage with hydraulic drive adapter 107 to extend the run time of the assembly 106 for as long as pressurized fluid from vessel 102 is provided to the hydraulic drive adapter 107. In some illustrative embodiments, sensor 518 may be configured to sense the produced energy and/or rotation from flywheel 508, where, if the produced energy and/or rotation of flywheel 508 falls below a predetermined threshold, the sensor 518 may send a control signal to solenoid valve 104 to open. In this configuration, the solenoid valve 104 may be configured to remain closed upon the initial loss of power from 132, which allows the flywheel 508 to continue producing energy from the already-produced kinetic buildup. This way, the run time of the flywheel rotary UPS may be extended even further.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus for providing extend runtime for a flywheel rotary UPS, comprising:
    a vessel, configured to receive and contain fluid;
    a piston having a predetermined weight, configured within the vessel to have the weight of the piston independently and vertically displaced by the fluid and provide pressure from the displacement;
    a fluid discharge line, operatively coupled to an output of the vessel;
    a valve, operatively coupled to the fluid discharge line;
    a fluid supply line operatively coupled to the valve;
    a flywheel rotary UPS comprising:
        a motor configured to rotate a flywheel for producing energy via electrical power, when electrical power is applied to a main power input of the flywheel rotary UPS,
        a hydraulic drive adapter operatively coupled to the flywheel and to the fluid supply line; and a sensor for sensing one or more thresholds of at least one of rotational characteristics of the flywheel and/or energy produced by the flywheel, wherein the sensor is configured to delay the opening of the valve until one of the thresholds are sensed to be below a predetermined minimum amount
    wherein the flywheel is configured to engage with the hydraulic drive adapter and the valve is configured to automatically open, when no electrical power is received at the main power input, to provide fluid pressurized by the piston to the hydraulic drive adapter and cause the flywheel rotary UPS to continue rotating for an extended ride-through time period after no electrical power is received.

2. The apparatus of claim 1, further comprising a fluid reservoir and a hydraulic pump, wherein the hydraulic pump is configured to pump fluid from the fluid reservoir to the vessel.

3. The apparatus of claim 2, wherein the fluid reservoir is operatively coupled to the hydraulic drive adapter and configured to receive fluid discharged from the hydraulic drive adapter.

4. The apparatus of claim 3, further comprising a check valve operatively coupled between a hydraulic pump and the vessel via a second fluid supply line, wherein the check valve is configured to directionally control flow of fluid to the vessel.

5. The apparatus of claim 1, wherein the valve comprises a solenoid valve.

6. The apparatus of claim 5, further comprising a pressure regulator valve, operatively coupled to the solenoid valve, wherein the pressure regulator valve is configured to regulate pressure provided by the piston in the fluid supply line.

7. A method for providing extend runtime for a flywheel rotary UPS, comprising:
    receiving and containing fluid in a vessel comprising a piston having a predetermined weight, positioned within the vessel, wherein the weight of the piston provides a pressure for the fluid in the vessel via an independent vertical displacement of the weight of the piston by the fluid, and wherein the vessel is operatively coupled to a fluid supply line;
    operatively rotating, via electrical power, a flywheel of the flywheel rotary UPS via a motor when electrical power is applied to a main power input of the flywheel rotary UPS;
    engaging the flywheel to a hydraulic drive adapter and automatically opening a valve when no electrical power is received at the main power input to provide fluid pressurized by the piston to the hydraulic drive adapter and cause the flywheel rotary UPS to continue rotating for an extended ride-through time period after no electrical power is received; and sensing, via a sensor, one or more thresholds of at least one of rotational characteristics of the flywheel and/or energy produced by the flywheel, and delaying the opening of the valve until one of the thresholds are sensed to be below a predetermined minimum amount.

8. The method of claim 7, wherein receiving fluid in the vessel comprises pumping fluid from a fluid reservoir, via a hydraulic pump, to the vessel.

9. The method of claim 8, further comprising receiving fluid discharged from the hydraulic drive adapter in the fluid reservoir.

10. The method of claim 7, further comprising directionally controlling flow of the fluid to the vessel via a check valve operatively coupled between the hydraulic pump and the vessel.

11. The method of claim 7, wherein automatically opening the valve comprises activating a solenoid valve.

12. The method of claim 7, further comprising regulating pressure provided by the piston in the fluid supply line via a pressure regulator valve, operatively coupled to the valve, comprising a solenoid valve.

13. An apparatus for providing extend runtime for a flywheel rotary UPS, comprising:
   a vessel, configured to receive and contain fluid;
   a piston having a predetermined weight, configured within the vessel to have the weight of the piston independently and vertically displaced by the fluid and provide pressure from the displacement;
   a fluid discharge line, operatively coupled to an output of the vessel;
   a valve, operatively coupled to the fluid discharge line;
   a fluid supply line operatively coupled to the valve;
   a flywheel rotary UPS comprising:
      a motor configured to rotate a flywheel for producing energy via electrical power, when electrical power is applied to a main power input of the flywheel rotary UPS,
      a sensor for sensing one or more thresholds of at least one of rotational characteristics of the flywheel and/or energy produced by the flywheel, and
      a hydraulic drive adapter operatively coupled to the flywheel and to the fluid supply line;
   wherein the flywheel is configured to engage with the hydraulic drive adapter and the valve is configured to automatically open, when no electrical power is received at the main power input, and upon receiving a control signal from the sensor, to provide fluid pressurized by the piston to the hydraulic drive adapter and cause the flywheel rotary UPS to continue rotating for an extended ride-through time period after no electrical power is received and wherein the sensor is configured to delay the opening of the valve until one of the thresholds are sensed to be below a predetermined minimum.

14. The apparatus of claim 13, further comprising a fluid reservoir and a hydraulic pump, wherein the hydraulic pump is configured to pump fluid from the fluid reservoir to the vessel.

15. The apparatus of claim 14, wherein the fluid reservoir is operatively coupled to the hydraulic drive adapter and configured to receive fluid discharged from the hydraulic drive adapter.

16. The apparatus of claim 15, further comprising a check valve operatively coupled between a hydraulic pump and the vessel via a second fluid supply line, wherein the check valve is configured to directionally control flow of fluid to the vessel.

17. The apparatus of claim 13, wherein the valve comprises a solenoid valve.

18. The apparatus of claim 17, further comprising a pressure regulator valve, operatively coupled to the solenoid valve, wherein the pressure regulator valve is configured to regulate pressure provided by the piston in the fluid supply line.

* * * * *